US008466804B2

(12) United States Patent
Vickas

(10) Patent No.: US 8,466,804 B2
(45) **Date of Patent: *Jun. 18, 2013**

(54) INCURSION COLLISION AVOIDANCE SYSTEM FOR VEHICLE TRAFFIC CONTROL

(76) Inventor: George Vickas, Chicago, IL (US)

( * ) Notice: Subject to any disclaimer, the term of this patent is extended or adjusted under 35 U.S.C. 154(b) by 1199 days.

This patent is subject to a terminal disclaimer.

(21) Appl. No.: 12/267,242

(22) Filed: Nov. 7, 2008

(65) Prior Publication Data

US 2009/0096636 A1 Apr. 16, 2009

Related U.S. Application Data

(63) Continuation of application No. 11/107,627, filed on Apr. 15, 2005, now Pat. No. 7,450,029, which is a continuation-in-part of application No. 10/990,806, filed on Nov. 17, 2004, now Pat. No. 7,414,545.

(60) Provisional application No. 60/530,713, filed on Dec. 18, 2003.

(51) Int. Cl.
*G08G 1/00* (2006.01)
*G08B 21/00* (2006.01)
*B60Q 7/00* (2006.01)

(52) U.S. Cl.
USPC ........... 340/901; 340/905; 340/958; 340/933; 340/941; 340/908.1

(58) Field of Classification Search
USPC .................................................. 340/901, 905
See application file for complete search history.

(56) References Cited

U.S. PATENT DOCUMENTS

| | | | | |
|---|---|---|---|---|
| 3,470,474 | A | 9/1969 | Rohrer | 325/51 |
| 3,660,762 | A | 5/1972 | Smith | 325/51 |
| 3,899,671 | A | 8/1975 | Stover | |
| 4,006,315 | A | 2/1977 | Halstead | 179/82 |
| 4,907,159 | A | 3/1990 | Mauge et al. | |
| 5,572,201 | A | 11/1996 | Graham et al. | |
| 5,729,213 | A | 3/1998 | Ferrari et al. | |
| 5,790,050 | A | 8/1998 | Parker | |
| 6,064,319 | A | 5/2000 | Matta | |
| 6,166,660 | A | 12/2000 | Grenier | |
| 6,252,521 | B1 | 6/2001 | Griffin et al. | 340/903 |
| 6,392,692 | B1 | 5/2002 | Monroe | 348/143 |
| 6,404,351 | B1 | 6/2002 | Beinke | 340/902 |
| 6,449,540 | B1 | 9/2002 | Rayner | 701/35 |
| 6,609,090 | B1 | 8/2003 | Hickman et al. | 704/9 |
| 6,812,854 | B1 | 11/2004 | Edwin et al. | 340/901 |
| 6,859,147 | B2 | 2/2005 | Buscemi | 340/902 |
| 6,941,152 | B2 | 9/2005 | Proctor et al. | |

(Continued)

OTHER PUBLICATIONS

Canadian Office Action for Canadian Patent Application 2,550,092, Dated Apr. 9, 2008 (4 pgs).

(Continued)

*Primary Examiner* — Donnie Crosland
(74) *Attorney, Agent, or Firm* — Nixon Peabody LLP

(57) ABSTRACT

A system to identify junctions of restricted areas to approaching vehicles, including at least one warning signal generator adapted to transmit the warning signal into areas traversed by the vehicles approaching the restricted areas, a receiver in each of the vehicles receiving the transmitted warning signals when the vehicle approaches one of the restricted areas, and an alarm responsive to the warning signal, which produces an alarm signal detectable by a vehicle operator.

20 Claims, 12 Drawing Sheets

U.S. PATENT DOCUMENTS

| | | | | |
|---|---|---|---|---|
| 7,117,089 | B2 | 10/2006 | Khatwa et al. | 701/301 |
| 7,414,545 | B2 * | 8/2008 | Vickas | 340/953 |
| 7,450,029 | B2 * | 11/2008 | Vickas | 340/901 |
| 2002/0155829 | A1 | 10/2002 | Proctor, Jr. et al. | 455/423 |
| 2002/0175829 | A1 | 11/2002 | Dunagin et al. | 340/905 |
| 2006/0114124 | A1 | 6/2006 | Vickas | 340/905 |

OTHER PUBLICATIONS

Canadian Office Action for Canadian Patent Application 2,543,873, Dated May 7, 2008 (2 pgs).

* cited by examiner

INCURSION COLLISION AVOIDANCE SYSTEM FOR VEHICLE TRAFFIC CONTROL

RELATED APPLICATION

This application is a continuation of U.S. patent application Ser. No. 11/107,627, now issued as U.S. Pat. No. 7,450,029, filed Apr. 15, 2005, which is a continuation-in-part of U.S. patent application Ser. No. 10/990,806, now issued as U.S. Pat. No. 7,414,545, filed Nov. 17, 2004, which claims the benefit of U.S. Provisional Application Ser. No. 60/530,713, filed Dec. 18, 2003, each of which is incorporated herein by reference in its entirety.

FIELD OF THE INVENTION

This invention is directed generally to the field of airport ground traffic control systems and, more particularly, to a system for alerting the drivers of vehicles in and/or around protected areas.

BACKGROUND OF THE INVENTION

Unauthorized and/or inadvertent incursions of ground vehicles and aircraft onto runways and other restricted airport areas can often have serious safety and financial results. The number of aircraft accidents, which occur on the ground is far greater than the number of accidents that occur during flight. Considering the number of occupants of a modern commercial airline, this is a serious public safety concern.

When an aircraft is issued instructions to circle the airport during a landing approach because of a runway incursion incident, there are financial implications for the airport and the airline. The plane, which was told to circle the airport, must be placed back into a landing pattern, causing delays and increasing fuel consumption. Both of these effects present a serious financial burden to airlines and airports, which run on tight schedules and have an increasing interest in maintaining low operating costs.

There are several types of incursion detection systems, such as the Airport Movement Areas Safety System (AMASS), Airport Surface Detection Equipment (ASDE), and the next generation (ASDE-X), to monitor runways and taxiways. These systems alert the air traffic controllers, who must then analyze the situation and determine a course of action. The instructions are then only sent to the aircraft, often informing them to continue circling, which is expensive and frustrating for passengers. Moreover, these systems are usually designed to detect and monitor the movement of aircraft, which are themselves large and more easily distinguished than ground traffic vehicles, which also traverse airfield taxiways, runways, and critical safety areas.

In a modern, large airport, and especially hub airports, there are generally a large number of ground support vehicles. There exists a need, therefore, for a low-cost runway incursion alerting system, which can be installed in or on ground support vehicles to provide a warning to the driver of protected zones and potentially dangerous situations. Additionally, the alerting system must be easy to use and understand by a wide range of personnel.

Such a system would also be useful in other restricted areas where a collision might occur between two vehicles, such as in a construction site, military training area, emergency response vehicles on public and/or private streets, or the like.

In accordance with one embodiment of the present invention, there is provided a method of alerting the drivers of traffic vehicles that they are approaching restricted area. In accordance with another embodiment of the present invention, there is provided a method of alerting the pilots or mechanic of aircraft while taxiing or towing the aircraft that they are approaching an active runway or an otherwise restricted airport area.

SUMMARY OF THE INVENTION

A system to identify restricted areas to approaching vehicles according to one embodiment of the present invention includes a warning signal generator. The generator is adapted to transmit the warning signal into areas traversed by vehicles approaching the restricted area. The system also includes a receiver in each of the vehicles. The receiver acts to receive the transmitted warning signals when the vehicle approaches the restricted area. An alarm is also a part of the system. In response to receiving the warning signal, the alarm produces an alarm signal detectable by a vehicle operator.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The foregoing and other advantages of the invention will become apparent upon reading the following detailed description and upon reference to the drawings.

Figure 1:
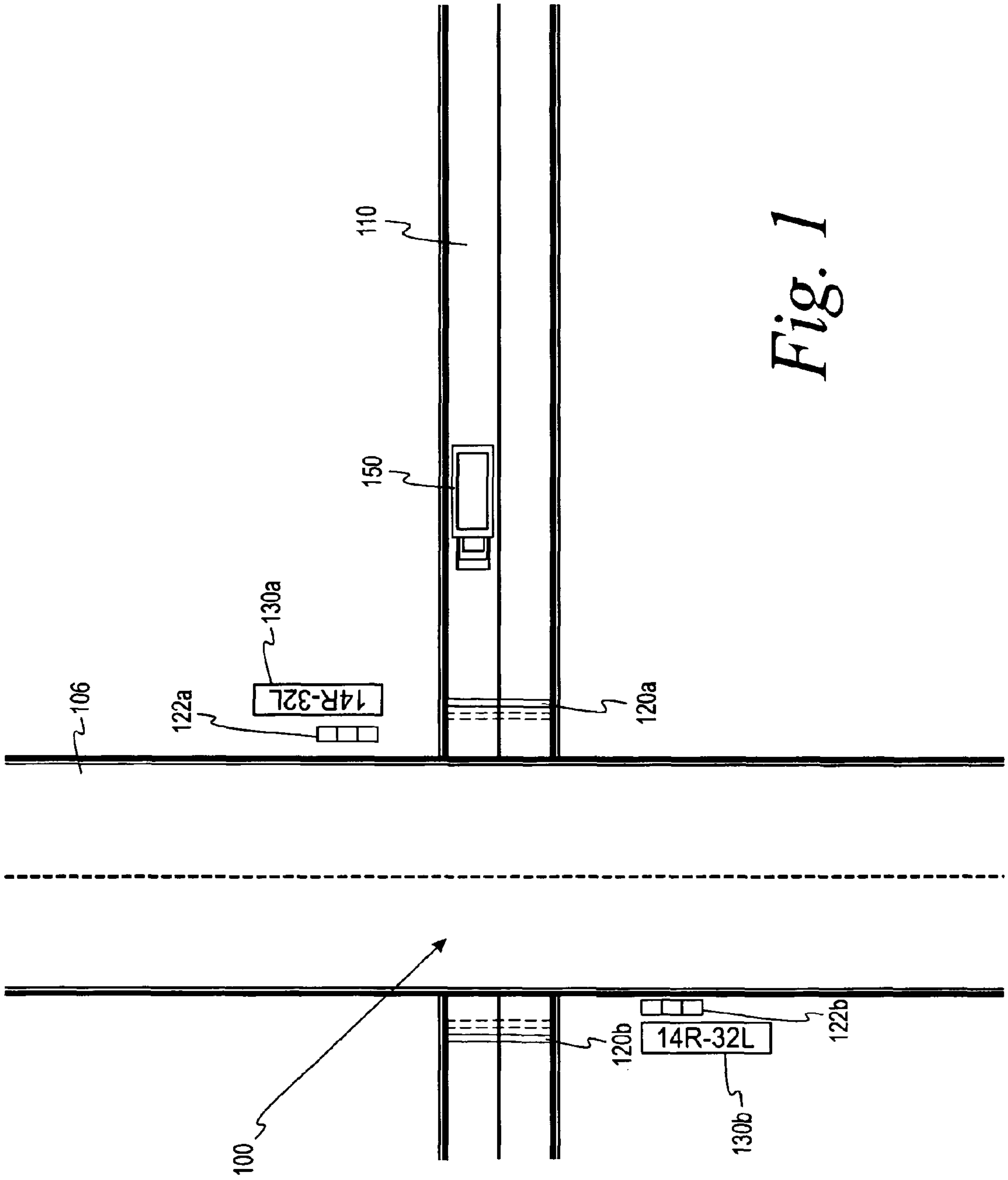
FIG. 1 is a diagrammatic representation of a typical airport runway/taxiway intersection, according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Although the invention will be described next in connection with certain preferred embodiments relating to ground vehicles at an airport, it will be understood that the invention is not limited to those particular embodiments. On the contrary, the description of the invention is intended to cover all alternatives, modifications, and equivalent arrangements as may be included within the spirit and scope of the invention as defined by the appended claims, such as vehicles entering any restricted area, such a construction site or military training area. Alternatively, the system may be used by emergency vehicles approaching intersections on public and/or private streets as will be described below.

Referring now to the drawings, and initially to FIG. 1, an intersection 100 of a typical airport runway 106 with an airport taxiway 110 is shown. The approaches to the intersection 100 are marked for ground traffic traveling in either direction across the intersection with holdbars 120*a* and 120*b*, guidance signs 130*a* and 130*b* and guard lights 122*a* and 122*b* on their respective sides of the intersection 100 as shown. The runway guard lights 122*a, b* are operated from ground traffic control. Guard lights are installed at certain, but not all intersections of an airport and are only a visual guidance to alerts pilots and vehicle drivers of a runway intersection.

Normally, when a ground traffic vehicle 150 approaches an active runway 106, the vehicle 150 stops at a holdbar 120*a* as shown. The vehicle operator must then contact the air traffic control tower for clearance to pass beyond the holdbar 120*a* and through the intersection 100. There is a danger, however, that due to weather conditions affecting the driver's visibility or other issues such as operator confusion, that the operator may be uncertain as to whether the runway 106, is in fact, active.

There exists a need therefore, to provide an extra level of security at such intersections to visually and/or audibly alert the driver that he or she is approaching an active runway intersection.

Figure 2:
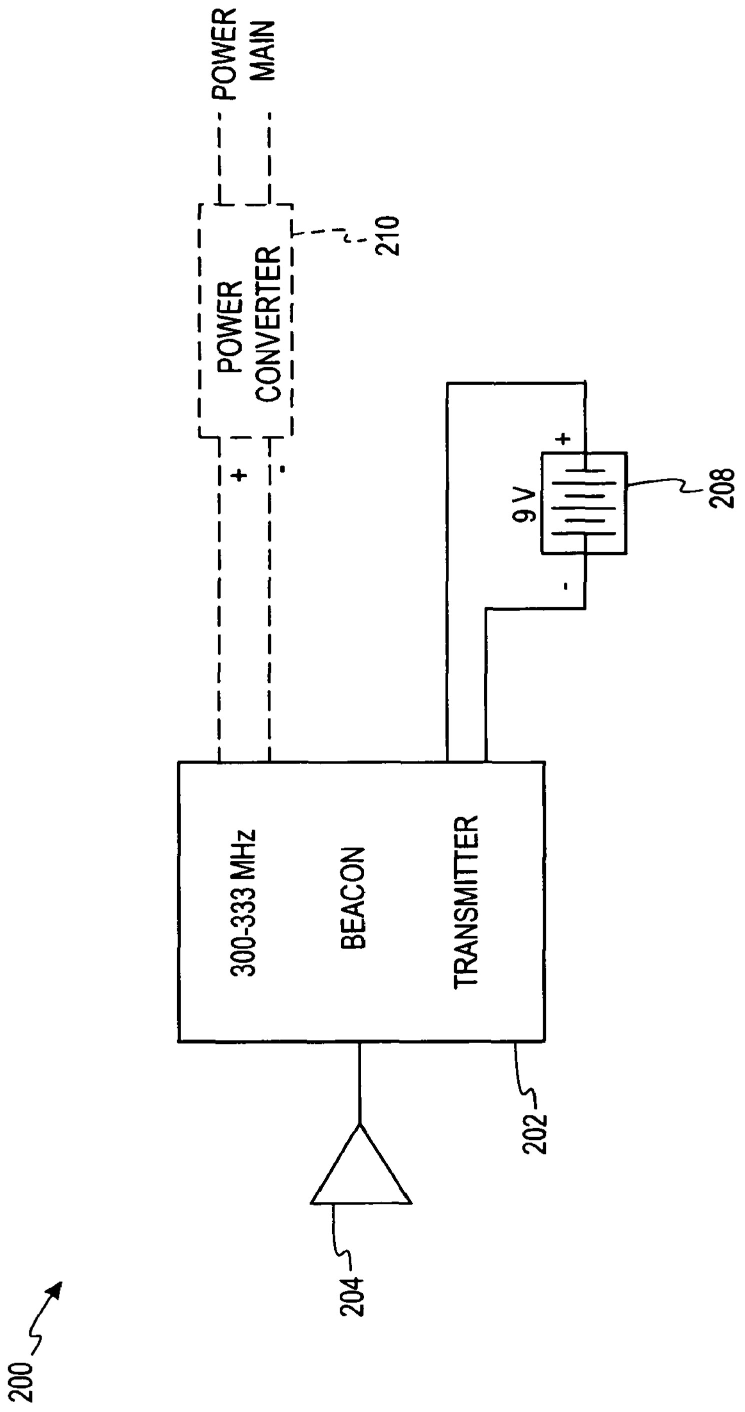
FIG. 2 is a block schematic diagram of incursion collision avoidance system (ICAS) transmitter module, according to one embodiment of the present invention.

FIG. 2 is a block diagram of an incursion collision avoidance transmitter module 200, according to one embodiment of the present invention. The ICAS transmitter module 200, according to one embodiment of the present invention, is powered by a voltage source 208, such as a 9-V battery. Other power sources, such as, but not limited to, a 6-V or 12-V battery may also be used. A beacon transmitter module 202 produces a low-power beacon frequency in the 300-333 MHz band. For some airports, especially those with multiple runways, it is desirable to be able to control the operational state of the ICAS transmitter module (on and off) remotely from a selected area on the airport. Under such a scenario, the alarm would not be activated in vehicles crossing an inactive runway. However, if on another day, the runway is active, the alarm would sound, indicating the active status to the driver. Therefore, according to another embodiment of the present invention, the ICAS transmitter module 200 may draw its power from the secondary electrical system of the airport through a power converter 210. Thus, the ICAS transmitter module 200 in the latter scenario only transmits a warning beacon when so controlled from the selected airport area.

Figure 3:
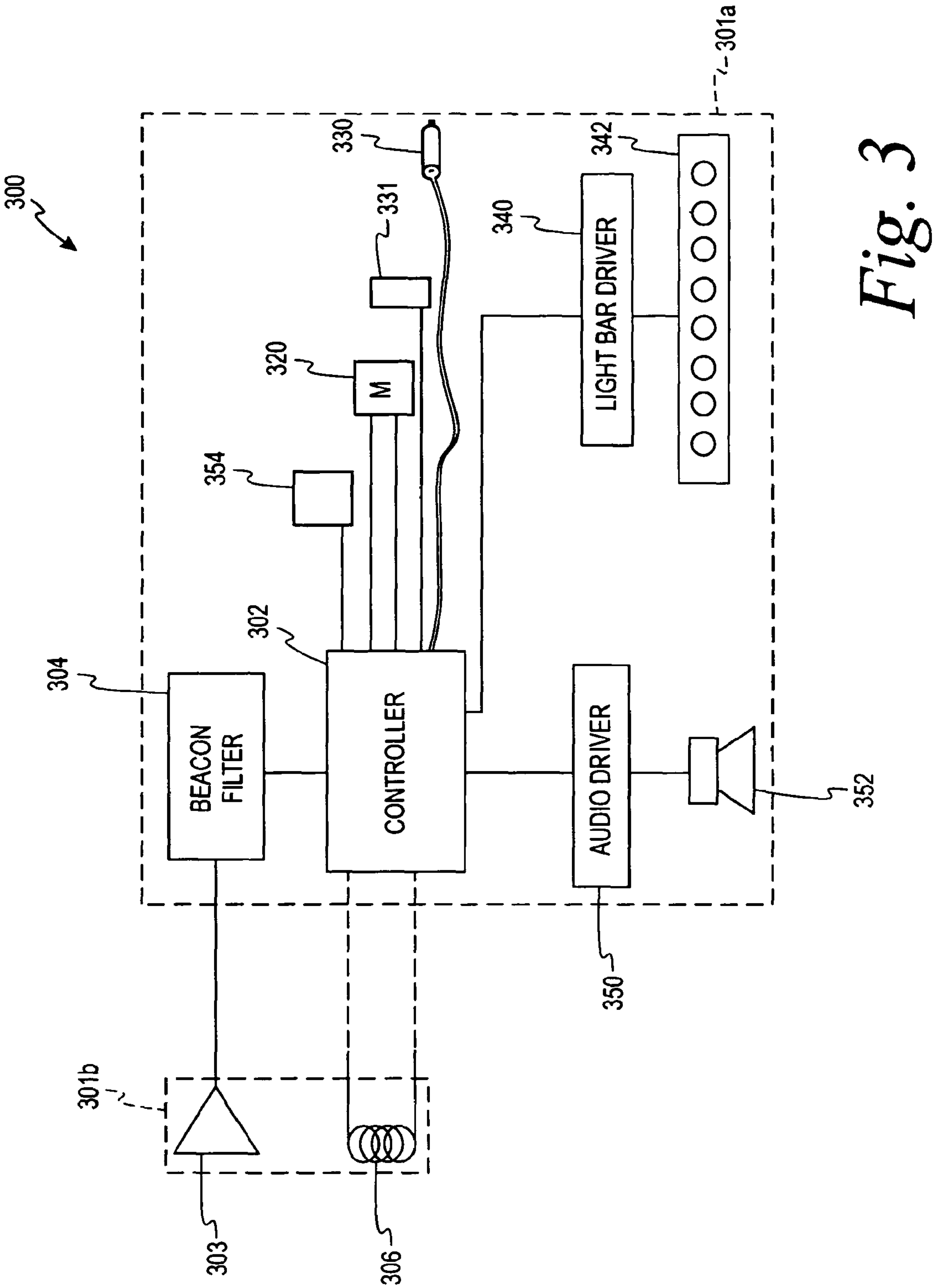
FIG. 3 is a block schematic diagram of an ICAS receiver module, according to one embodiment of the present invention.

FIG. 3 is a block diagram of an incursion collision avoidance receiver module 300, according to one embodiment of the current invention. The ICAS receiver module 300 is installed in a ground traffic vehicle, and has a controller 302, powered by the vehicle's electrical system by means of a utility lighter plug 330. In an alternate embodiment of the present invention, the ICAS receiver module is hard-wired into the electrical system of the vehicle. In some embodiments, the receiver 300 has a battery back-up 331 to provide power to the receiver in case it becomes unplugged or is tampered with.

In some embodiments of the present invention, a data voice recorder 354 may be included in the receiver module 300. The data voice recorder 354 is coupled to the controller 302 and will record the data that the receiver module 300 receives for a period of time (e.g., 7-14 days). The data voice recorder 354 is similar to a "black box" device in an airplane and will record and time stamp events such as, but not limited to, the receiver module 300 being powered on/off and when the receiver module 300 receives an alarm notification. The data voice recorder 354 will be able to record a power off event such as someone tampering with the receiver module 300 or turning of the power source to the receiver module 300. In the case of an incident, the data voice recorder would be removed from the receiver module 300 and the information would be downloaded onto a computer (similar to how a plane's "black box" is reviewed after an airplane incident).

According to different embodiments of the present invention, the ICAS receiver module 300 is divided into two parts, a receiver case 301*a* and the receiver remote sensor 301*b*. The receiver case 301*a* and the receiver remote sensor 301*b* are connected by a wire. The receiver remote sensor 301*b* is capable of receiving beacon signal inputs from different sources. Three types of source inputs are shown in this illustrative example, an RF antenna 304*a* and beacon filter 304, and an inductive pickup 306. The remote receiver sensor 301*b* may be placed on the inside of the vehicle, or on the outside of the vehicle, such as on the front grill. If the remote receiver sensor 301*b* is located on the outside of the vehicle, it should be encased in a weather-proof plastic or fiberglass box.

The receiver case 301*a* includes a controller 302 that receives a warning beacon signal from one or more of the input sources mentioned and produces an auditory warning signal, usually in the form of a digitized voice through a driver circuit 350 to a speaker 352. The controller 302 also provides a visual warning indication by controlling a series of lights on a light bar 342 in response to the same warning beacon input. In some embodiments, the light bar 342 may be an LCD display with a scrolling message. In different embodiments of the present invention, the light bar driver 340 can be directed to pulse the lights of the light bar 342 or provide a variety of noticeable patterns.

According to one embodiment of the present invention, the receiver antenna 302 is used to detect radio-frequency beacon signals in the 300-333 MHz band. The beacon filter 304 further refines the received signal, filtering out RF noise and unwanted signals.

According to another embodiment of the present invention, an inductive pickup 306 senses a low frequency electrical field such as might be detected from a buried cable and are typically of a very low frequency (VLF).

When a vehicle equipped with an ICAS receiver 200 encounters a protected zone, such as a runway intersection 100, the vehicle driver is expected to make contact with airport ground control before entering the protected zone. The auditory warning signal is quite loud so as to not be ignored. Accordingly, in one embodiment of the present invention, a mute button 320 is provided so that when the ICAS receiver 300 detects a warning zone, the auditory signal can be muted so that the driver of the vehicle can communicate with the ground control tower.

Figure 4A:
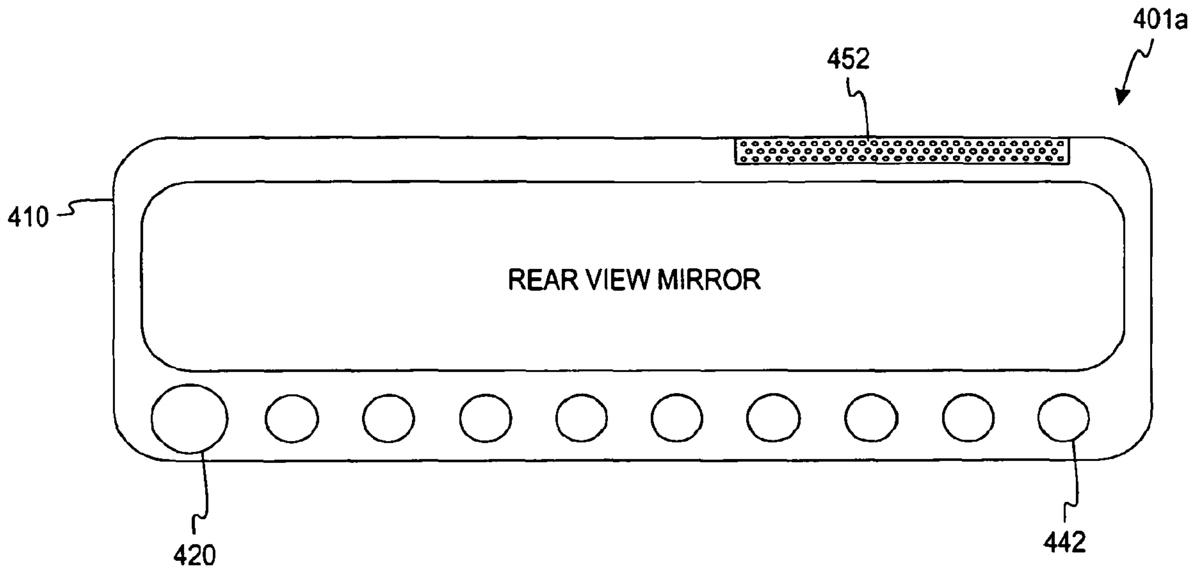
FIG. 4*a* is a diagrammatic representation of an ICAS receiver module according to another embodiment of the present invention.

Turning now to FIG. 4*a*, an alternative embodiment of a receiver case 401*a* is illustrated. In this embodiment, the receiver case 401*a* is incorporated into a rear-view mirror 410 of the vehicle. The receiver case 401*a* may include flashing LED lights 442 along the bottom of the mirror 410 to provide the visual warning and a speaker 452 to include an auditory warning. A mute button 420, similar in operation to the mute button 320 described above, is also included.

Figure 4B:
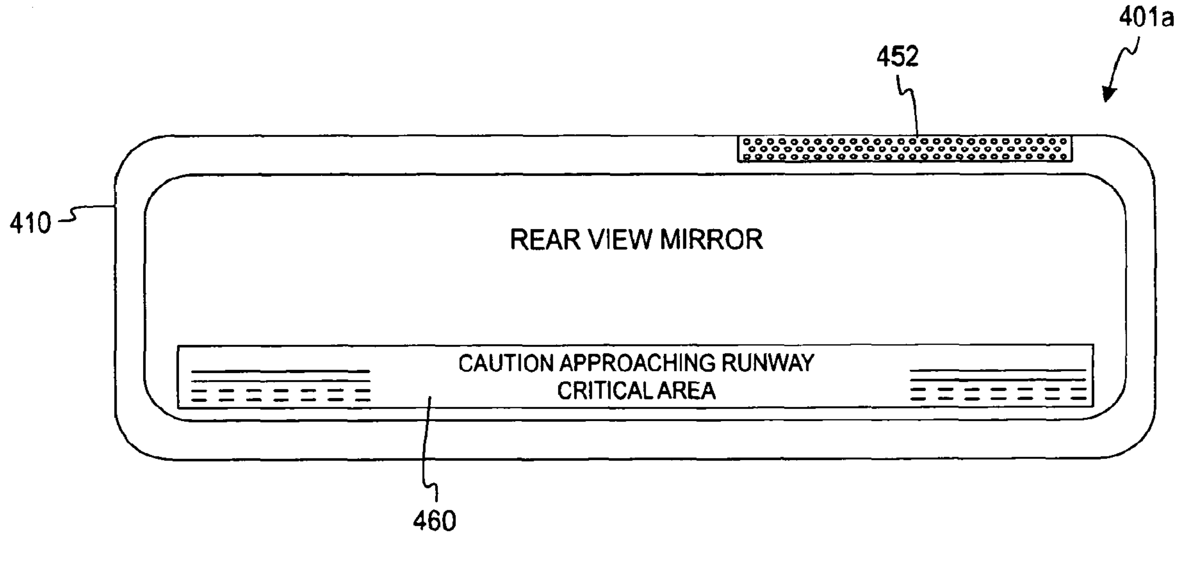
FIG. 4*b* is a diagrammatic representation of an ICAS receiver module according to another embodiment of the present invention.

In another embodiment shown in FIG. 4*b*, instead of flashing lights 442, the rear view mirror 410 may include a message 460 that appears in the bottom portion of the mirror 410 when the vehicle approaches a controlled area. When the vehicle is not in a controlled or restricted area, the mirror 410 will look like a normal rear-view mirror. The message may be a written warning as shown in the figure or it may take the form of a flashing light.

Figure 5:
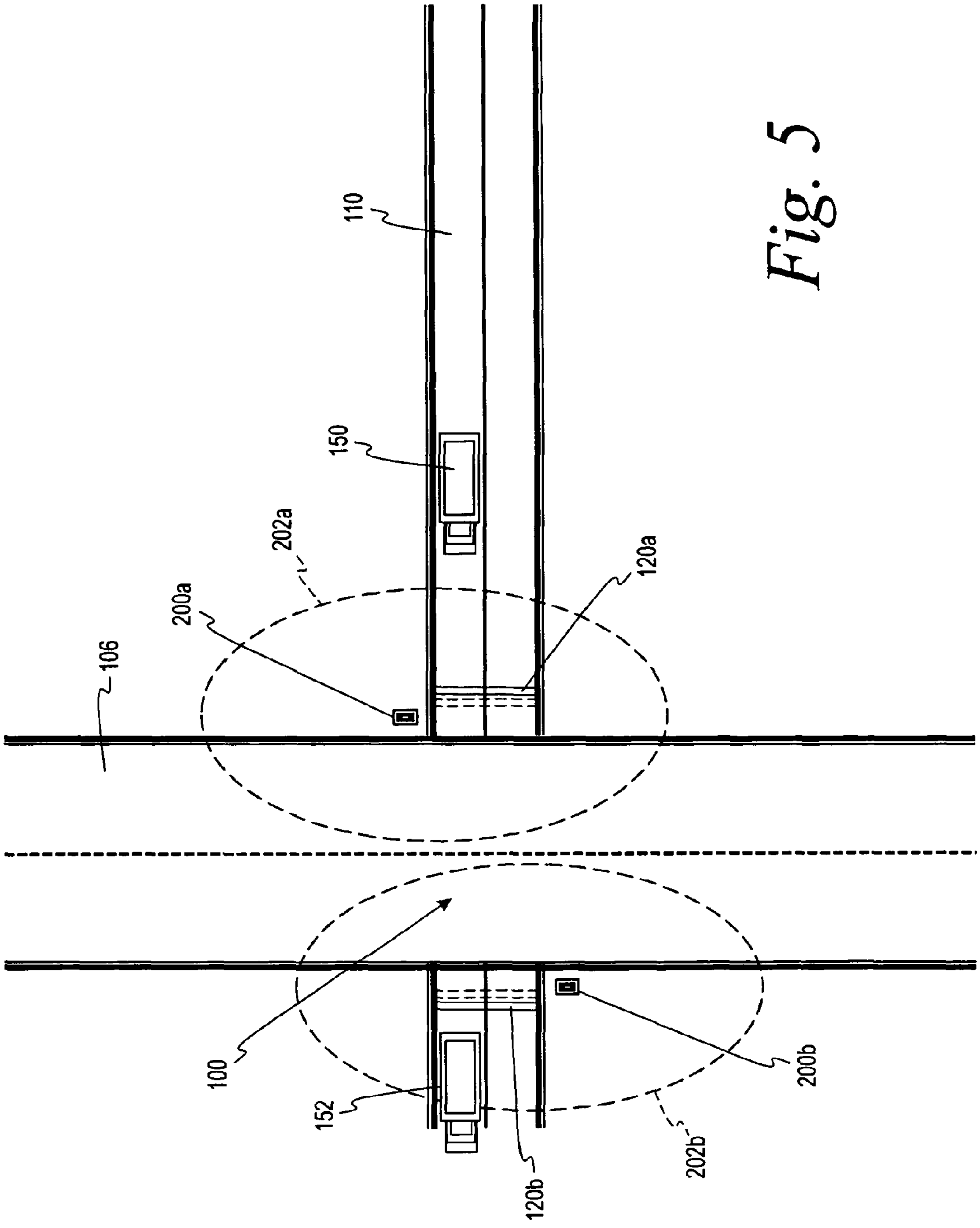
FIG. 5 is a diagrammatic representation of a typical airport runway/taxiway intersection protected by ICAS transmitters, according to one embodiment of the present invention.

FIG. 5, illustrates a runway intersection 100 of an active runway 106 and a taxiway 110. The intersection 100 has two ICAS transmitter modules 200*a* and 200*b*, each of which produces a radio frequency warning beacon in the 300-333 MHz band. The two ICAS transmitter modules 200*a* and 200*b* provide illustrative coverage zones 202*a* and 202*b*, respectively, for vehicles approaching the intersection 100 from either direction. When the vehicle 150 encounters a warning beacon zone 202*b*, the driver is alerted to the presence of the intersection by the audio and visual warning signals of the ICAS receiver as discussed above. The operator then approaches the holdbar 120*a* or another vehicle in front, and stops, awaiting further communication with the air traffic control tower before proceeding over the intersection 100. The operator may choose to press the mute button 320 of the ICAS receiver 300 after the warning signal has been generated, as discussed above. As the vehicle passes through the zones 202*a* and 202*b* the warning indications remain active. When the vehicle 150 is clear of the intersection 100 and the ICAS transmitter zones 202*a* and 202*b*, as shown by the position of vehicle 152, the warning indications of the ICAS receiver in the vehicle 150 are terminated and the muting function is reset. The ICAS receiver 300 is now ready to provide warning indications when another protected intersection is encountered.

Figure 6A:
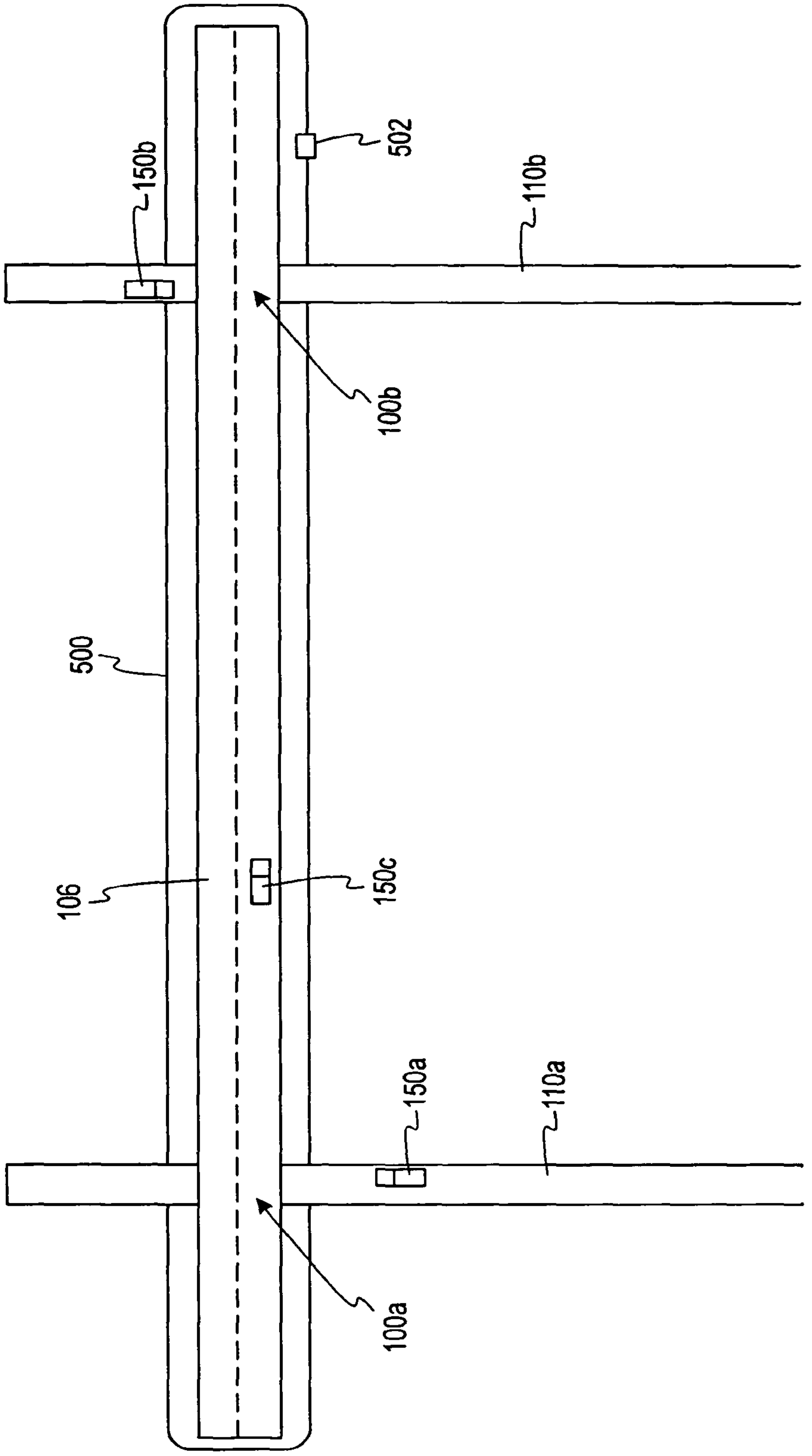
FIG. 6*a* is a diagrammatic representation of a typical airport runway with taxiway intersections protected by an inductive incursion collision avoidance field according to one embodiment of the present invention.

Turning now to FIG. 6*a*, an active runway 106, according to another embodiment of the present invention, is protected by an inductive antenna 500. The inductive antenna 500 is a trenched buried cable, which is used to transmit a very low frequency. Preferably, the cable is a 14-gauge stranded cable that is capable of emitting signals through pavement and concrete. In other embodiments, the cable may be a 10 or 12 gauge stranded cable that is capable of emitting signals through pavement and concrete. The cable 500 may also be any other form of cable capable of transmitting a signal through the earth and/or concrete. The inductive antenna 500 is buried outside the runway safety zone, as set by the FAA and the specific airport authority. Preferably, the inductive antenna 500 is 22,000 feet in length, and surrounds the runway as shown. The inductive antenna 500 can be controlled from a single generating point 502 in synchronization with the other active runway indications such as the guard lights 122 previously mentioned.

Figure 6B:
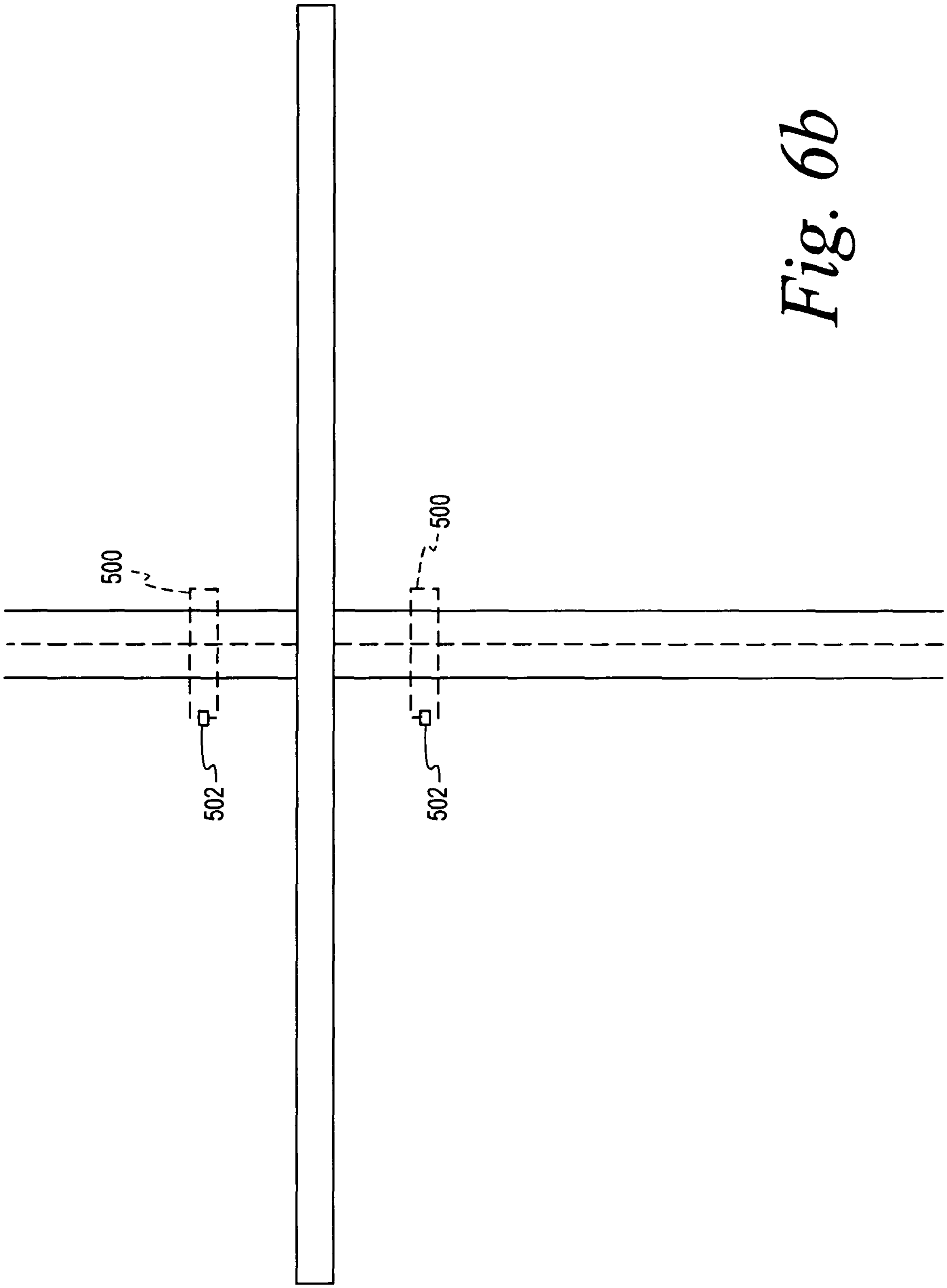
FIG. 6*b* is a diagrammatic representation of a typical airport runway with taxiway intersections protected by an inductive incursion collision avoidance field according to another embodiment of the present invention.

Turning now to FIG. 6*b*, another embodiment utilizing inductive antennas 500 is shown. In this embodiment, the inductive antenna 500 is shorter, and loops only around the road or taxiway right before an intersection. According to this embodiment, there are four loops of inductive antenna 500, one transmitting on each side of the intersection. In other embodiments, there may only be two loops of the inductive antenna 500, for example, if the one taxiway is only used by airplanes, the taxiway may not have the loops of the antenna 500.

Thus, vehicles driving on taxiways 110*a* and 110*b*, respectively, sense the very low frequency warning beacon according to one embodiment of the present invention, when they come within 60-90 feet of the buried inductive antenna 500 as they approach their respective intersections 100*a* and 100*b*. According to another embodiment of the present invention, the approaching vehicles will sense the very low frequency warning beacon in a narrower 2-5 foot band.

Figure 7A:
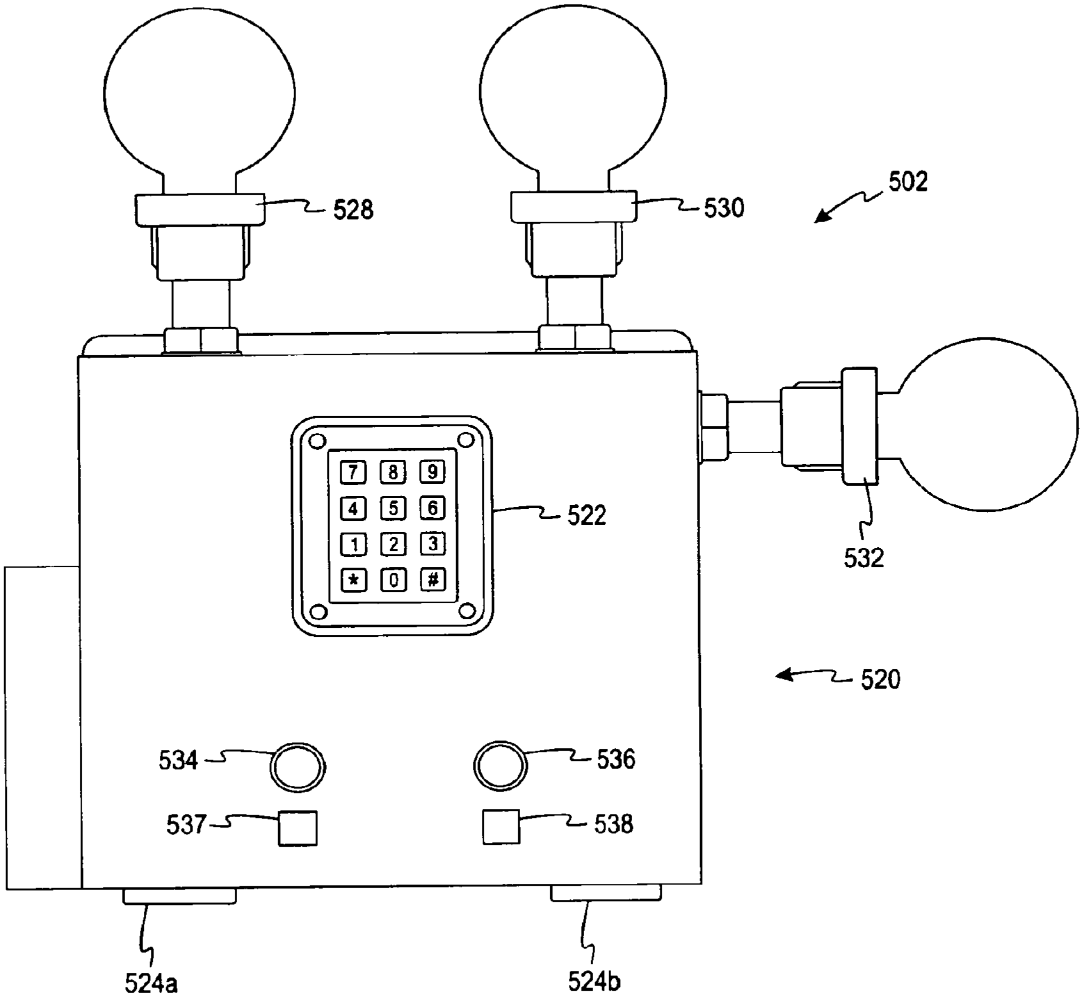
FIG. 7*a* is a perspective view of an ICAS transmitter according to one embodiment of the present invention.

Turning now to FIG. 7*a*, the single generating point 502, or transmitter, will be described. The transmitter 502 operates on a supplied voltage ranging from 120 volts to 440 volts. The supplied voltage can be supplied by a standard AC voltage, a 12 volt battery, or a solar panel-charged battery. The solar panel-charged battery includes a battery block with solar panels, as is known in the art. The battery is connected to the transmitter 502 via a power connection.

The transmitter 502 includes a housing 520 that may be made of steel, plastic, aluminum, fiberglass, or other waterproof material. On the front of the housing 520, a manual keypad 522 or other entry system is provided to limit access to the interior of the transmitter 502. The entry system may also be a keyed switch, a biometric reader (e.g., fingerprint or retina scanner), and/or a card reader. Control or operation of the system can also be accomplished by a remote computer based software system. The housing 520 sits on a pair of frangible couplings 524*a*, 524*b*, which are on a concrete foundation. Alternatively, the couplings 524*a*, 524*b* may utilize earth anchors to secure them to the ground.

Indicator lights 528, 530, 532 are also included for a visual indication of the system's operational status. The illustrated embodiment shows three lights, but other numbers may be used. In the illustrated embodiment, the first light 528 is a green light that is activated when the ICAS system is turned off. This indicates to personnel that it is safe to proceed onto a runway or other restricted area.

The second light 530 is a steady red light that is activated when the ICAS system is turned on. The second light 530 indicates to personnel that the runway or restricted area is operational with aircraft (or other vehicles) and that no entry is granted. The third light 532 is a flashing yellow light that is activated when there is a problem with the system. For example, if the antenna loop 500 is cut or if there is a malfunction with internal components of the transmitter 502, the light 532 will flash until the problem is corrected.

The housing 520 also includes a green LED 534 and a red LED 536 to provide an indication of when the system has been de-activated by the key pad 522 (green LED 534) or activated by the key pad 522 (red LED 536). Activation and de-activation switches 537, 538, respectively are also included. After the user inputs the number in the key pad 522, the user activates the appropriate switch 537, 538 to either activate or de-activate the system.

Figure 7B:
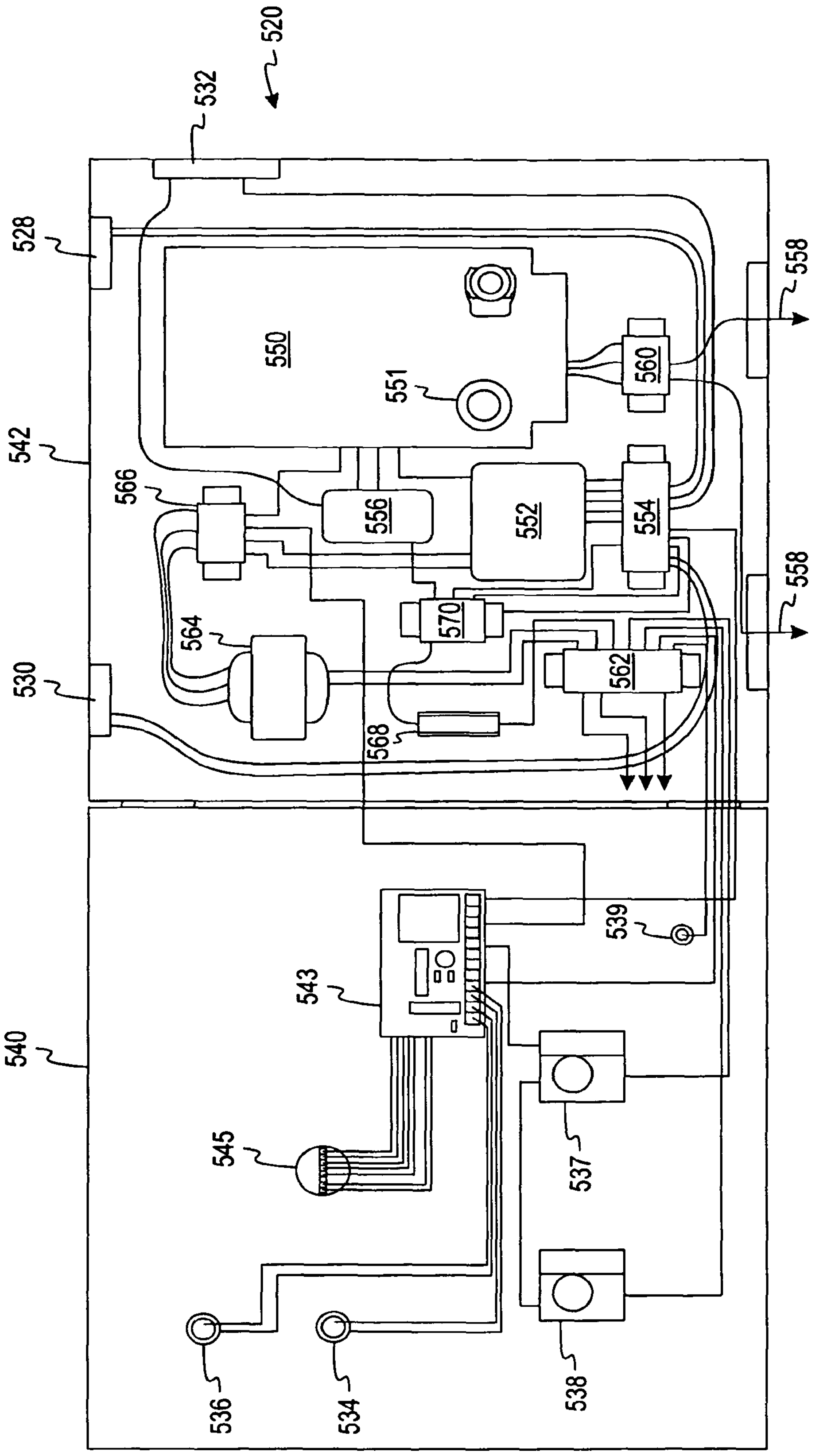
FIG. 7*b* is a block diagram of an inside of the ICAS transmitter of FIG. 7*a*.

Turning now to FIG. 7*b*, the inside of the transmitter 502 will be described. The inside contains two sides, a door side 540 and a box side 542. The door side 540 contains a key pad logic control board 543 used to control the operation of the system and identifies the inputs for activation and deactivation. The key pad 522 (FIG. 7*a*) is connected to the key pad logic control board 543 through a key pad control harness 545. The key pad logic control board 543 is also connected to the green and red LEDs 534, 536 and the activation and de-activation switches 537, 538. The door side 542 also includes a ground terminal 539 that acts to ground the door of the housing 520, so as to prevent static electricity build-up.

Turning now to the box side 542, the transmitter 502 includes a main control board 550 that controls the sensitivity of the inductive antenna 500. The main control board 550 is manufactured by Miltronics Manufacturing, Inc. of Keene, N.H. and sold as "Freedom Fence XMTR." The main control board includes a sensitivity knob 551, whose operation is described in U.S. Pat. No. 5,272,466 to Venczel, which is incorporated herein in its entirety. The main control board 550 is connected to a flashing warning light relay 552, which is in turn connected to a power and control distribution block 554. The power and control distribution block 554 takes the signal from the main control board and the key pad logic control board 543 and causes the three lights 528, 530, 532 to turn on, off and/or flash. The power and control distribution block 554 is also connected to a fuse that provides protection for many of the internal components. In some embodiments, the above circuitry may be replaced by integrated circuits, as is known in the art.

The main control board 550 is also connected to a warning light flashing relay 556, which is connected to the flashing indicator light 532. The inductive antenna 500 is connected to the main control board 500 through loop output wires 558 and a loop output terminal block 560.

A 120V distribution block 562 is connected to the outside power source and is used to provide power to a power transformer 564 that transforms the 120V AC from the distribution block 562 into a 12V DC source. The power transformer 564 sends the 12V DC source to a 12V distribution block 566. The distribution block 566 then provides power to the key pad logic control board 543, the control board 550, and the indicator light relay 552.

The 120V power supply 562 is also coupled to a fuse 568 that provides internal protection of the circuitry. If an overload is sensed, the fuse blows and power is cut. The power and control distribution block 554, the activation and de-activation switches 537, 538, the key pad logic control board 543 and the grounding terminal 539 are all also connected to the 120V power supply 562.

A grounding terminal block 570 is also connected to the internal circuits to distribute grounding.

One of the frequent operations performed by airport ground personnel is the permissible entry onto an runway for routine, daily inspection and/or repairs, such as construction, snow removal and surface maintenance. During these authorized entries, it is desirable to maintain the active state of the runway 106. Therefore, during authorized runway entries by inspection or emergency repair vehicles, the visual and/or auditory warning signal of the ICAS receiver 300 continue to alert the driver and crew of the vehicle of their incursion during the entire period that the vehicle is on the runway. In some embodiments, the system can incorporate a GPS transceiver as is known in the art to further provide tracking of the vehicles as they traverse the runways. In the embodiments incorporating the GPS transceiver, the GPS transceiver would transmit the data to the ICAS receiver 300. In these embodiments, instead of using a system that incorporates a ground loop or wired technology, a GPS satellite will track the movement of a vehicle on the airport. The GPS will be pre-programmed with the location information of the intersections and will activate an alarm situation when the vehicle approaches the intersections (or other protected areas) within the airport. Segments and/or ranges of latitudinal and longitudinal coordinates of the critical areas will be programmed into the GPS. Also, these coordinates can be turned on/off, so that the GPS will not transmit an alarm signal if the runway is closed (or the area is not currently restricted). The receiver 300 may be adapted to receive the GPS signals and may include all of the features described elsewhere in the description (data voice recorder, volume control, mute button, message scroll, LED lights, etc. . . . ).

Figure 8:
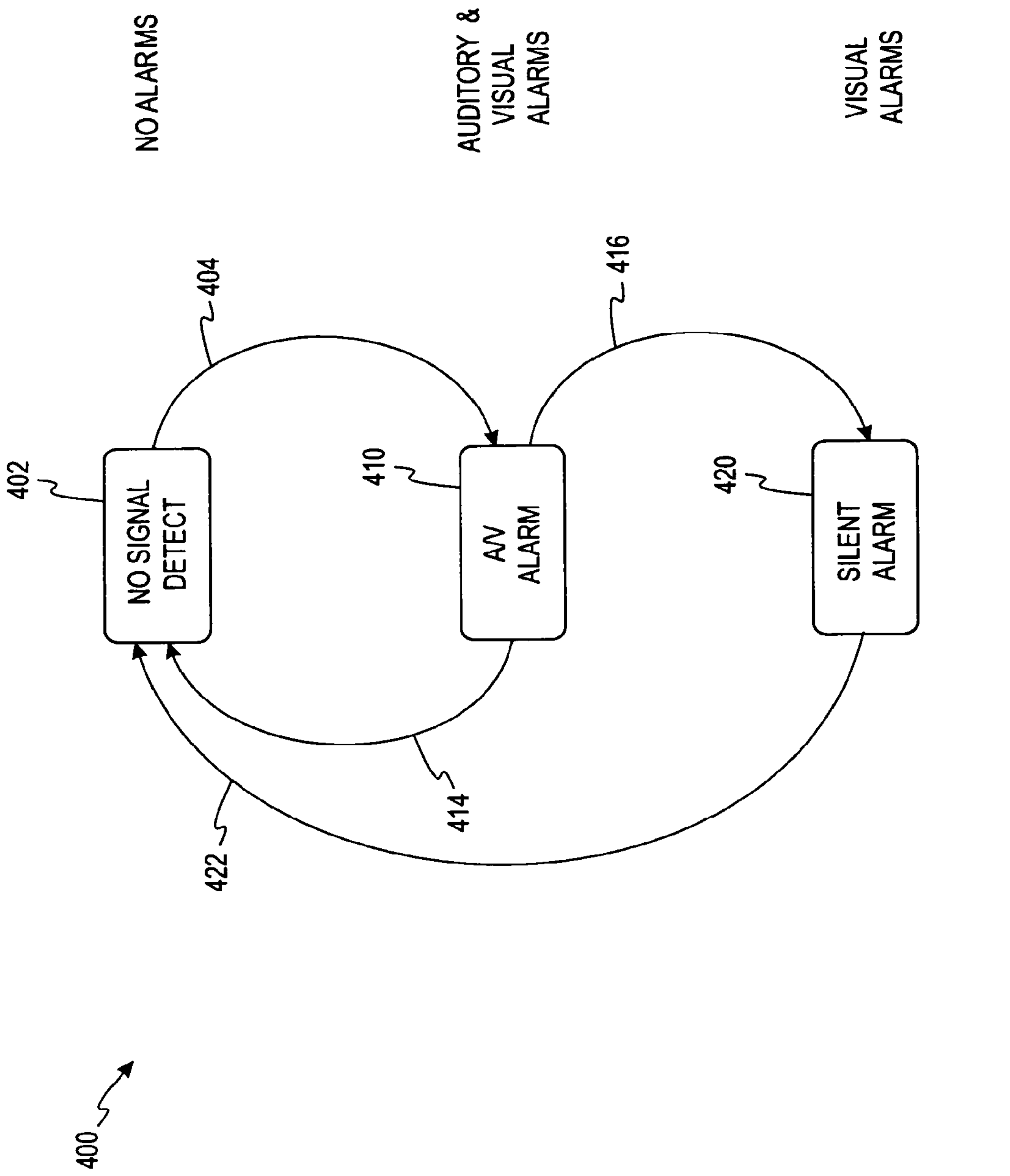
FIG. 8 is a state transition diagram of the ICAS receiver module mute function, according to one embodiment of the present invention.

FIG. 8 is a state transition diagram, according to one embodiment of the present invention, of a mute alarm feature, activated by the mute button 320. As mentioned above, when the vehicle 150 approaches an active intersection 100, the ICAS receiver 300 in the vehicle produces both visual and auditory alarms indications. The auditory indication is a recorded vocal warning at a fairly high volume using the speaker 352 so that it is difficult for the driver to ignore. This type of warning is also provided in aircraft cockpits to cover a variety of flight warning situations. Since it is also important for the driver to be able to talk to the ground control tower as well, to be able to hear ground control broadcasts, it is desirable to be able to suppress the auditory alarm feature for some duration of time. In some embodiments, the speaker 352 may come with an adjustable volume control that is either continuous or discrete. For example, the volume of the speaker 352 may be adjusted to 25, 50, or 75% of the full volume in some embodiments.

According to one embodiment of the present invention, the ICAS receiver 300 is equipped with a mute button 320, as described earlier, to suppress the auditory alarm for a fixed period of time. If the vehicle remains in the runway intersection 100 past the timeout period of the mute feature, the auditory alarm sounds again. Thus, the mute button 320 acts in a manner similar to the snooze feature of an alarm clock.

According to one embodiment of the present invention, once the warning message starts, the mute function silences the auditory warning for a period of time. The period of time can be pre-programmed into the receiver, or it may be set by the customer or operator. In some embodiments, the warning may only be muted for as little as 15 seconds. In other embodiments, it may be muted for a period of 2 to 3 minutes. After the mute period, the auditory warning starts again as long as the vehicle is within detection range of the ICAS transmitter 200. Examples of the digitized auditory warnings are:

1. "STOP YOUR VEHICLE, APPROACHING RUNWAY CRITICAL AREA"
2. "STOP, CONTACT AIR TRAFFIC CONTROL TOWER FOR CLEARANCE"
3. "DO NOT PROCEED ACROSS MANDATORY HOLD BAR WITHOUT AIR TRAFFIC CONTROL CLEARANCE"
4. "CAUTION, APPROACHING RUNWAY SAFETY AREA"

If the vehicle 150 remains in the active runway intersection 100 for a very long time, as when waiting during long landing pattern intervals, the constant resetting of the mute button 320, to silence the auditory warning, may be a nuisance, and could result in the driver missing an important control tower broadcast. Therefore, according to another embodiment of the present invention, the mute button 320 suppresses the auditory alarm during the time that the vehicle is within the active intersection protection area zone and resets when the vehicle exits the protected zone. This activity is described by the finite state diagram of the mute system 400 shown in FIG. 7. When the vehicle 150 does not detect a signal from a protection zone 100, the ICAS receiver alarming state 402 idles and no alarms are provided. When a protection zone is detected, by any of the warning beacon inputs available, a transition 404 is made to the A/V alarm state 410 and both visual and auditory alarms are continually provided. While at the A/V alarm state, if the ICAS receiver 300 ceases to detect a warning beacon signal, a transition 414, is made back to state 402 and all alarm indications are turned off. However, if the mute button is activated during the signal detect state 410, a transition 416 is made to the silent alarm state 420 where the auditory alarm indication is turned off but the visual alarm continues to be provided. The silent alarm/signal detect state remains until the ICAS receiver 300 no longer detects a warning signal and transition 422 is made to the no beacon signal detect state 402, and all alarms are discontinued.

In some embodiments, the transmitter

The above embodiments have been described relative to a system in use at an airport. However, as explained above, the invention may also be utilized at other restricted areas, such as construction sites and military training areas. While the preferred embodiment described above is a permanent system, the transmitter 502 and inductive loop 500 may be temporary. A moveable or temporary system is especially useful in construction sites, which are likely to be temporarily restricted to vehicles. In such an embodiment, the inductive loop 500 of cable may or may not be buried and the transmitter 502 is portable and not fixed into the ground.

Figure 9A:
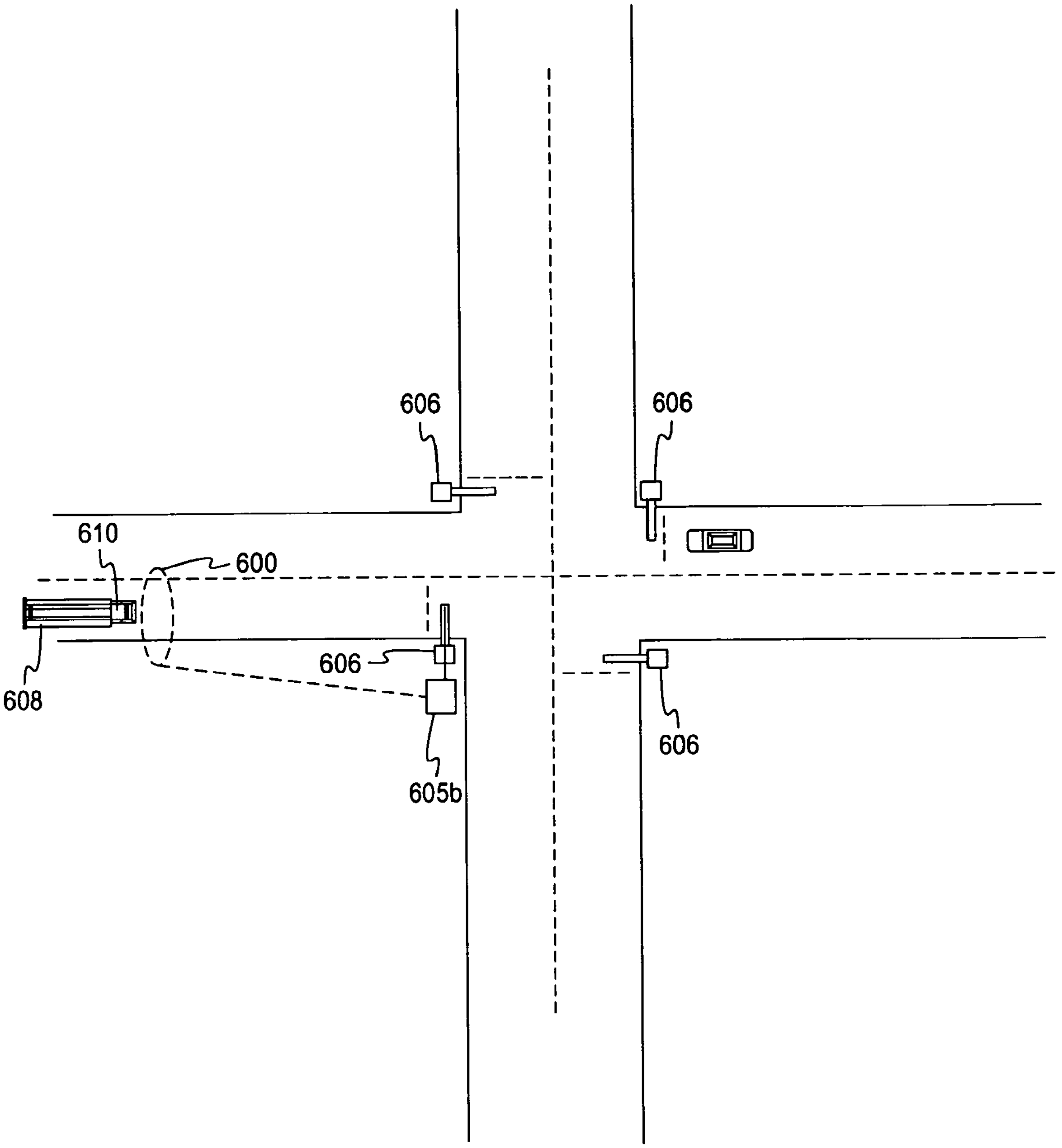
FIG. 9 is a diagrammatic representation of a typical two-street intersection protected by an inductive ICAS according to another embodiment of the present invention.
Figure 9B:
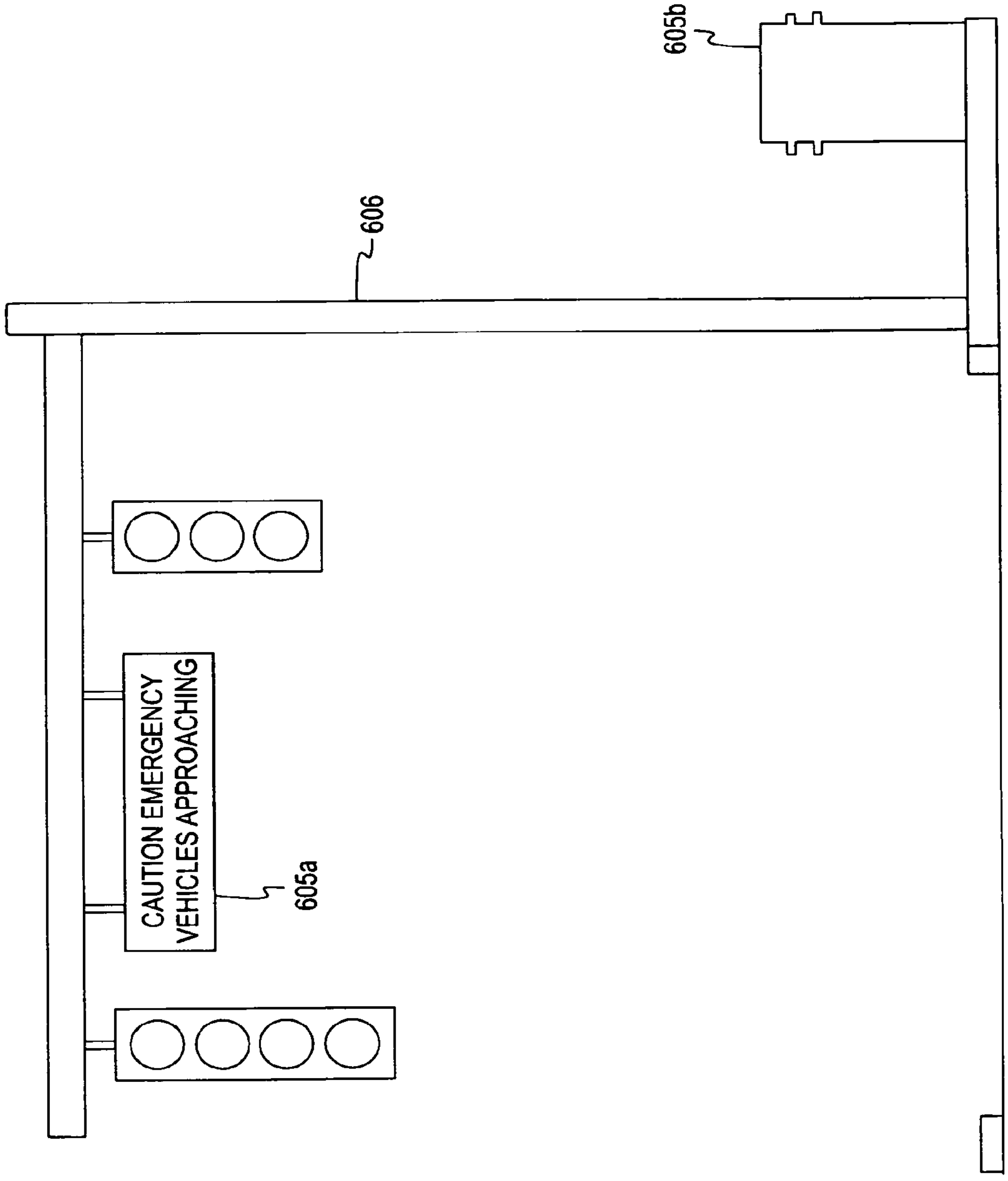

Turning now to FIGS. 9*a* and 9*b*, another embodiment of the present invention is described. In FIG. 9*a*, a regular street intersection is shown. An inductive loop 600 is located near the intersection. The inductive loop 600 operates the same as the inductive loop 500 described above in reference to FIGS. 6*a*-7*b*. In this embodiment, a receiver module is located on a stop light 606 (FIG. 9*b*). The receiver module 604 operates the same as the receiver module 300 described above in reference to FIG. 3. The receiver module 604 may include a separate receiver case 605*a* and a remote sensor 605*b* that are the same as the receiver case 301*a* and the remote sensor 301*b* described above. The receiver case 605*a* and the remote sensor 605*b* may be included in separate housings and in different locations (e.g., the receiver case 605*a* may be near or under the lights as shown while the remote sensor 605*b* is located on the post) as illustrated. Alternatively, the receiver module 604 may include both systems in one location (e.g., near the stop lights).

In this embodiment, as shown in FIG. 9*a*, a transmitter module 610 is located on a vehicle 608 as opposed to being stationary. The vehicle 608 may be any type of emergency vehicle such as a police car, ambulance, or fire truck. In operation, as the emergency vehicle 608 approaches the inductive loop 600, the transmitter 610 is activated and sends a signal to the stationary receiver module 604. The receiver module 604 acts as the receiver module 300 described above and provides auditory and/or visual warnings regarding the approaching emergency vehicle 608. Such a system would provide warning to other vehicles approaching the intersection so that the other vehicles may wait for the emergency vehicle to pass through the intersection. Although most emergency vehicles have sirens, these may not be heard by all drivers of the other vehicles. Also, the drivers of the vehicles may not be able to tell which direction the emergency vehicle 608 is headed and where it is going—thus making it difficult for the drivers to properly maneuver out of the way. However, the above-described system may include visual warnings indicating the direction of the emergency vehicle, helping the other drivers make better decisions.

In the above description, the term "vehicle" has generally been used to describe ground transportation vehicles. However, it should be understood that vehicle can refer to vehicles such as airplanes. In some situations, an airplane may need to cross over an active runway, and it is important that the pilot be alerted as to the status (whether active or inactive) of the runway. The airplane would include the receiver 300 as described above.

While the present invention has been described with reference to one or more particular embodiments, those skilled in the art will recognize that many changes may be made thereto without departing from the spirit and scope of the present invention. Each of these embodiments and obvious variations thereof is contemplated as failing within the spirit and scope of the claimed invention, which is set forth in the following claims.

What is claimed is:

1. A method of avoiding collisions in a restricted movement area of an airport traversed by both airplanes moving on the ground and ground traffic vehicles, comprising:

generating a low-frequency warning signal;

radiating said warning signal into a selected area traversed by said ground traffic vehicles approaching said restricted movement area, said selected area being near said restricted movement area, said warning signal being radiated from a cable buried in the ground; and in response to one of said ground traffic vehicles being proximate to said buried cable and before said one of said ground traffic vehicles enters said restricted movement area, receiving said radiated warning signal with a receiver in said one of said ground traffic vehicles so as to alert a vehicle operator to restrict a movement of said one of said ground traffic vehicles into said restricted movement area.

2. The method of claim 1, wherein the generation of said warning signal is powered by a battery.

3. The method of claim 1, wherein in response to receiving said radiated warning signal, alerting said one of said ground traffic vehicles with an advance warning alarm when said warning signal is received.

4. The method of claim 3, wherein said advance warning alarm is presented on a rear-view mirror of the vehicle.

5. The method of claim 3, wherein said advance warning alarm is an audio alarm.

6. A method of avoiding collisions in a restricted movement area of an airport traversed by both airplanes moving on the ground and ground traffic vehicles, comprising:

generating a low-frequency warning signal having a frequency in the range from about 3 kHz to about 30 kHz;

transmitting said warning signal through a buried cable extending around at least a portion of a selected area traversed by said vehicles approaching said restricted movement area, said warning signal continuously radiating upwardly from the ground into said selected area and being independent of a location of said vehicle within said selected area; and in response to one of said vehicles being proximate to said buried cable and before said one of said vehicles enters said restricted movement areas, receiving said radiated warning signal in said one of said vehicles to alert a vehicle operator of said restricted movement area.

7. The method of claim 6, further including activating an advance warning alarm in response to receiving said warning signal to alert the vehicle operator before said one of said vehicles enters said one of said restricted movement area.

8. The method of claim 7, wherein said advance warning alarm includes an auditory warning when said warning signal is received.

9. The method of claim 7, wherein said advance warning alarm includes a visual warning when said warning signal is received.

10. The method of claim 6, wherein said receiving occurs when said one of said vehicles passes directly over said buried cable.

11. The method of claim 7, wherein a receiver in said one of said vehicles is a single band-width receiver that is automatically tuned to the frequency of said low-frequency warning radiating from said buried cable.

12. A method of avoiding collisions in a restricted movement area of an airport traversed by both airplanes and ground traffic vehicles, said restricted movement area containing an airport runway, said method comprising:

in response to said airport runway being in an operational state, generating a warning signal from a cable buried within the ground;

radiating said warning signal upwardly from said ground and into a selected area traversed by said vehicles approaching said restricted movement area, said selected area being outside of said restricted movement area; and alerting the vehicle operator of a first vehicle of said restricted movement area in response to said warning signal being received when said first vehicle is in said selected area, said alerting including activating an advance warning alarm that instructs the vehicle operator to restrict movement of said first vehicle into said restricted movement area.

13. The method of claim 12, wherein said advance warning alarm is an auditory alarm in said vehicle and further including generating said auditory warning when said warning signal is received in said vehicle.

14. The method of claim 12, wherein said advance warning alarm includes a digitized auditory warning in said vehicle and further including generating said digitized auditory warning when said warning signal is received.

15. The method of claim 12, wherein said advance warning alarm includes a visual warning in said vehicle and further including generating said visual warning of patterned, flashing lights when said warning signal is received.

16. The method of claim 12, wherein said vehicle includes a receiver with a receiving sensor and an alarm module, said receiver receiving said radiated warning signal.

17. The method of claim 12, wherein said buried cable is an inductive cable that extends around the entire restricted movement area.

18. The method of claim 12, wherein said buried cable is an inductive cable that extends around an entire junction in said restricted movement area.

19. The method of claim 12, wherein said generating includes controlling an on/off state of said warning signal from a remote location in said airport.

20. The method of claim 19, further including turning off said warning signal in response to said airport runway being in a non-operational state.

* * * * *